(12) United States Patent
Yamaguchi et al.

(10) Patent No.: US 12,224,407 B2
(45) Date of Patent: Feb. 11, 2025

(54) BATTERY PACK AND WIRELESS LINKING SYSTEM

(71) Applicant: Koki Holdings Co., Ltd., Tokyo (JP)

(72) Inventors: Satoshi Yamaguchi, Ibaraki (JP); Hiroyuki Hanawa, Ibaraki (JP); Tatsuya Ito, Ibaraki (JP); Kenta Harada, Ibaraki (JP); Hiromi Takahashi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 761 days.

(21) Appl. No.: 17/059,265

(22) PCT Filed: May 29, 2019

(86) PCT No.: PCT/JP2019/021321
§ 371 (c)(1),
(2) Date: Nov. 27, 2020

(87) PCT Pub. No.: WO2019/230808
PCT Pub. Date: Dec. 5, 2019

(65) Prior Publication Data
US 2021/0210793 A1    Jul. 8, 2021

(30) Foreign Application Priority Data

May 31, 2018   (JP) ................................. 2018-104733

(51) Int. Cl.
*H01M 10/42*    (2006.01)
*B23Q 11/00*    (2006.01)
(Continued)

(52) U.S. Cl.
CPC ....... *H01M 10/425* (2013.01); *B23Q 11/0046* (2013.01); *B25F 5/02* (2013.01);
(Continued)

(58) Field of Classification Search
CPC .. H01M 10/425; H01M 10/48; H01M 50/569; H01M 50/583; H01M 50/247;
(Continued)

(56) References Cited

U.S. PATENT DOCUMENTS 9,014,627 B2 *   4/2015   Kim ....................... H04K 3/822
                                                                 455/343.1
9,537,335 B2 *   1/2017   Furui ........................ H02J 7/00
(Continued)

FOREIGN PATENT DOCUMENTS

DE        102017111539     11/2017
EP          2962813          1/2016
(Continued)

OTHER PUBLICATIONS

"Search Report of Europe Counterpart Application", issued on Apr. 30, 2021, pp. 1-8.
(Continued)

*Primary Examiner* — Mong-Thuy T Tran
(74) *Attorney, Agent, or Firm* — JCIPRNET

(57) ABSTRACT

The present invention maintains compatibility with a power tool having no wireless connection function, and prevents malfunctions due to linked operation. A battery pack that supplies a driving power source to a power tool, said battery pack comprising: a wireless communication unit for communicating wirelessly with an external device; and a control unit that performs a first determination process to determine the state of a wireless communication connection with the external device, wherein when the control unit has determined in the first determination process that wireless communication has been established, the control unit transmits a linking command to the external device, and during a state in which the wireless communication has been established,
(Continued)

the control unit can perform a communication connection cancellation process to cancel the wireless communication.

21 Claims, 10 Drawing Sheets

(51) Int. Cl.
  *B25F 5/02*   (2006.01)
  *G08C 17/02*  (2006.01)
  *H01M 10/48*  (2006.01)
  *H01M 50/247* (2021.01)
  *H01M 50/569* (2021.01)
  *H01M 50/583* (2021.01)
  *H02J 7/00*   (2006.01)
  *B23D 59/00*  (2006.01)

(52) U.S. Cl.
  CPC ............ *G08C 17/02* (2013.01); *H01M 10/48* (2013.01); *H01M 50/247* (2021.01); *H01M 50/569* (2021.01); *H01M 50/583* (2021.01); *H02J 7/00032* (2020.01); *H02J 7/0047* (2013.01); *H02J 7/0063* (2013.01); *B23D 59/006* (2013.01); *H01M 2010/4278* (2013.01); *H01M 2220/30* (2013.01)

(58) Field of Classification Search
  CPC ....... H01M 2010/4278; H01M 2220/30; H02J 7/00032; H02J 7/0047; H02J 7/0063; B23Q 11/0046; B25F 5/02; G08C 17/02; B23D 59/006
  USPC ......................................................... 455/41.2
  See application file for complete search history.

(56) References Cited

U.S. PATENT DOCUMENTS

| | | | | |
|---|---|---|---|---|
| 10,586,670 B2 * | 3/2020 | Shen | .................... | H01H 50/18 |
| 11,011,917 B2 * | 5/2021 | Park | .................. | H01M 10/4257 |
| 11,059,382 B2 * | 7/2021 | Han | .................... | H01M 50/249 |
| 2014/0051358 A1 * | 2/2014 | Dina | ...................... | B23K 9/322 |
| | | | | 455/41.2 |
| 2015/0200535 A1 | 7/2015 | Uesugi et al. | | |
| 2015/0350821 A1 * | 12/2015 | Dina | .................... | B23K 9/1087 |
| | | | | 455/41.2 |
| 2016/0151846 A1 * | 6/2016 | Suzuki | .................. | A47L 7/0095 |
| | | | | 340/12.5 |
| 2016/0311094 A1 | 10/2016 | Mergener et al. | | |
| 2016/0373457 A1 * | 12/2016 | Matson | ................. | H04L 67/306 |
| 2017/0216986 A1 * | 8/2017 | Dey, IV | ................. | B23D 51/16 |
| 2018/0104802 A1 | 4/2018 | Mergener et al. | | |
| 2018/0126537 A1 | 5/2018 | Tanaka et al. | | |
| 2018/0146267 A1 | 5/2018 | Stampfl et al. | | |
| 2018/0229317 A1 * | 8/2018 | Suzuki | ..................... | H05K 3/36 |
| 2019/0103805 A1 * | 4/2019 | Zhu | ....................... | H02J 7/0063 |
| 2020/0242436 A1 * | 7/2020 | Yang | .................. | G06K 17/0029 |

FOREIGN PATENT DOCUMENTS

| | | |
|---|---|---|
| JP | 2000184607 | 6/2000 |
| JP | 2002315223 | 10/2002 |
| JP | 2004195565 | 7/2004 |
| JP | 2010155302 | 7/2010 |
| JP | 2013255965 | 12/2013 |
| JP | 2015030060 | 2/2015 |
| JP | 2016013588 | 1/2016 |
| JP | 2016147356 | 8/2016 |
| JP | 2017004944 | 1/2017 |
| JP | 2017518193 | 7/2017 |
| JP | 2018069431 | 5/2018 |
| WO | 2010047255 | 4/2010 |

OTHER PUBLICATIONS

"Office Action of China Counterpart Application" with English translation thereof, issued on Mar. 25, 2024, p. 1-p. 14.
"Office Action of Japan Counterpart Application", issued on Jun. 6, 2023, with English translation thereof, p. 1-p. 8.
"International Search Report (Form PCT/ISA/210) of PCT/JP2019/021321," mailed on Aug. 13, 2019, with English translation thereof, pp. 1-3.
"Office Action of China Counterpart Application", with English translation thereof, issued on Sep. 28, 2024, p. 1-p. 25.

* cited by examiner

BATTERY PACK AND WIRELESS LINKING SYSTEM

CROSS-REFERENCE TO RELATED APPLICATION

This application is a 371 application of international application of PCT application serial no. PCT/JP2019/021321, filed on May 29, 2019, which claims the priority benefit of Japan application no. 2018-104733, filed on May 31, 2018. The entirety of each of the above-mentioned patent applications is hereby incorporated by reference herein and made a part of this specification.

BACKGROUND OF THE INVENTION

1. Field of the Invention

The invention relates to a battery pack and a wireless linking system.

2. Description of Related Art

In order to suck dust generated during an operation of a power tool by using a dust collector, a linked operation in which a dust collecting hose of the dust collector is connected to the power tool and the dust collector is driven through linkage with driving of the power tool is performed in the conventional art. In the linked operation, as a means for the dust collector to detect the driving of the power tool, it is a common means to set a configuration in which the driving power of the power tool is supplied from the dust collector by connecting a power cord of the power tool to the dust collector, and determines the power tool as being driven at the time when the dust collector outputs power, as disclosed in Patent Document 1.

PRIOR ART DOCUMENT(S)

Patent Document(s)

Patent Document 1: Japanese Laid-open No. 2010-155302

SUMMARY OF THE INVENTION

Problems to be Solved

In order to perform the linked operation without using a power cord, there is a technique in which a wireless signal transmitter is disposed on the power tool, a wireless signal receiver is disposed on the dust collector, and when the dust collector receives a driving signal of the power tool through wireless communication, the fan of the dust collector is driven to start suction. However, in the configuration, if there is no power tool capable of wireless communication, the linked operation with an external device such as the dust collector using the wireless communication function cannot be performed.

The objective of the invention is to provide a battery pack and a wireless linking system capable of maintaining the compatibility with a power tool having no wireless communication function and preventing malfunctions due to the linked operation.

Means for Solving the Problem

As a preferred example, a battery pack of the invention supplies a driving power source to a power tool, and includes: a wireless communication unit, for communicating wirelessly with an external device; and a control unit, performing a first determination process to determine a wireless communication connection state with the external device. In a case where the control unit determines in the first determination process that wireless communication is established, the control unit transmits a linking command to the external device, and during a state in which the wireless communication is established, the control unit is able to perform a communication connection cancellation process to cancel the wireless communication.

As a preferred example, a wireless linking system of the invention has the battery pack, the power tool, and the external device having a wireless communication function. The power tool includes a power tool motor, a tip tool driven by a driving force of the power tool, and a tool side connection terminal for connecting with the battery pack. The external device includes an external device motor, a device wireless communication unit for communicating wirelessly with the battery pack, and a device control unit operating the external device motor based on the linking command received from the battery pack, and stopping an operation of the external device motor based on the communication connection cancellation process executed by the control unit.

Inventive Effect

According to the invention, the compatibility with the power tool not having the wireless communication function can be maintained, and malfunctions due to the linked operation can be prevented.

DESCRIPTION OF THE EMBODIMENTS

In the following, the embodiments of a battery pack, a power tool and a system including the battery pack, the power tool, and an external device will be described in detail with reference to the drawings. Identical or equivalent forming elements, members, etc., in the respective drawings are labeled with identical symbols, and repeated descriptions will be omitted as appropriate. In addition, the embodiments do not serve to limit the invention, but should serve as exemplifications, and all the features and combinations thereof described in the embodiments are not limited as being necessarily essential to the invention.

Figure 1:
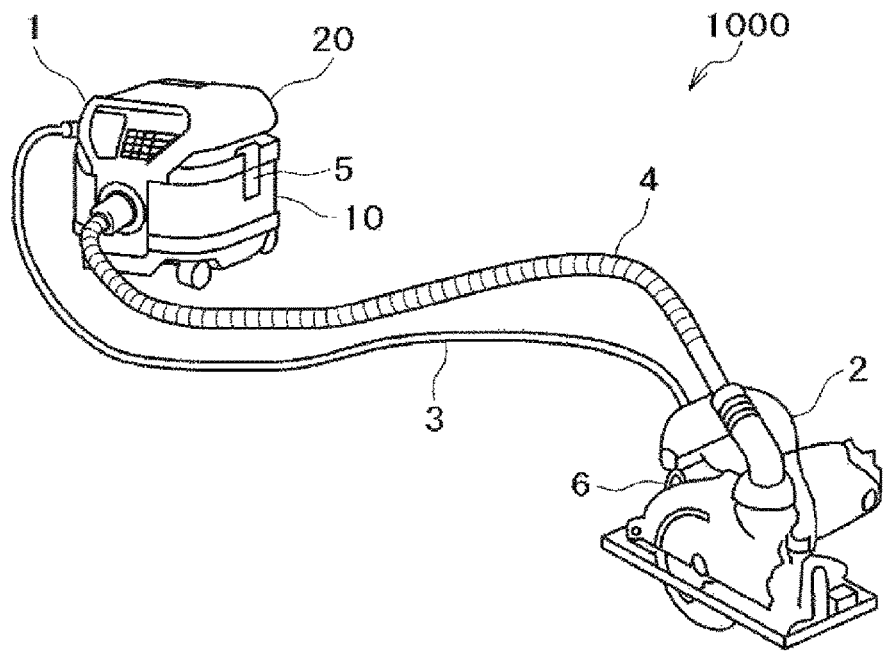
FIG. 1 is a schematic perspective view illustrating a configuration example of a wireless linking system.

FIG. 1 is a schematic perspective view illustrating a configuration example of a system (referred to in the following as "wireless linking system") 1000 including a battery pack, a power tool, and an external device in the embodiment. As shown in FIG. 1, the wireless linking system 1000 is configured so that a dust collector 1, as an example of the external device, is connected to a circular saw 2, as an example of the power tool, by a dust collecting hose 4, and chips, etc., generated by the circular saw 2 can be sucked by the dust collector 1. The head part of the dust collector 1 is removably fixed to the upper part of a tank part by a clamp mechanism 5 that serves as an installation mechanism.

The dust collector 1 and the circular saw 2 are connected by a power cable 3, and the circular saw 2 can be supplied with power from the dust collector 1. In addition, in the circular saw 2, a battery pack 6 is disposed so as to be operable even in the case where no power is supplied from from the power cable 3. In the following, while the power tool is exemplified as a circular saw, various other power tools, such as a jigsaw, a grinder, and a hammer drill, etc., can also be used. Firstly, descriptions are made about the dust collector 1.

Figure 2:
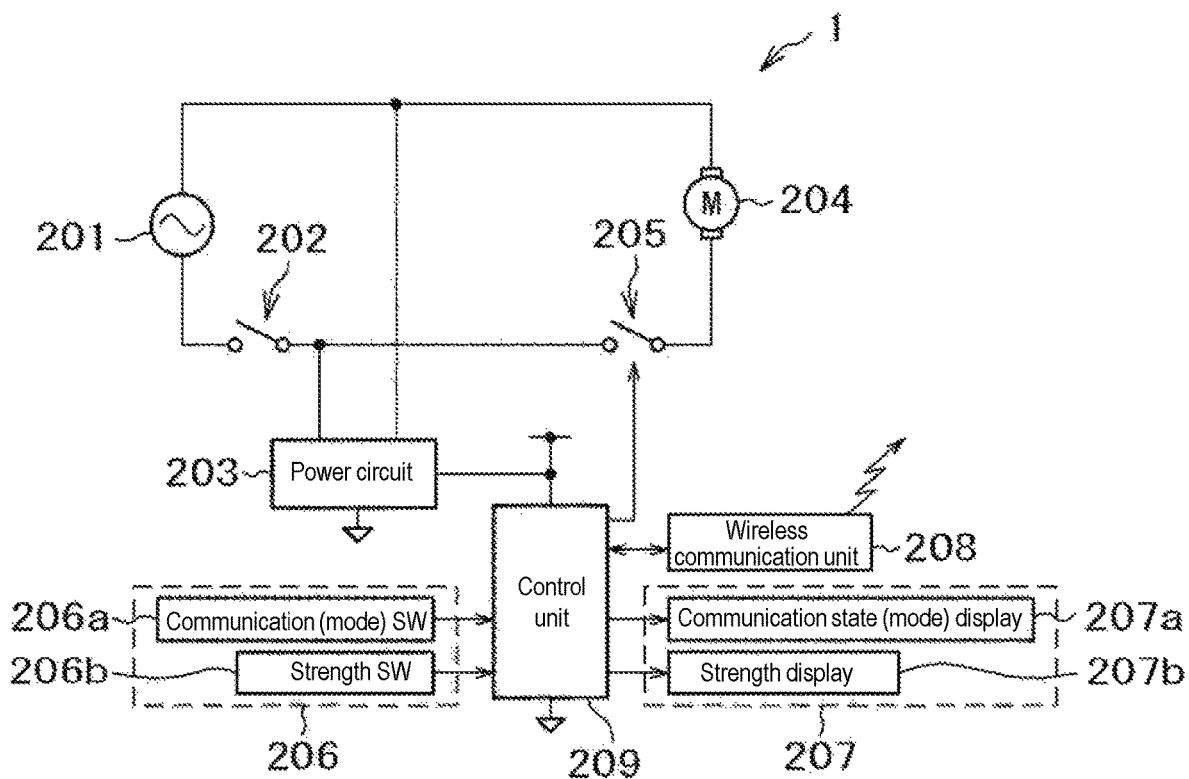
FIG. 2 is a schematic diagram of a circuit configuration of a dust collector (AC dust collector) as an example of an external device.

FIG. 2 is a schematic diagram of a circuit configuration of a dust collector (AC dust collector) as an example of the external device. As shown in FIG. 2, the AC dust collector includes an alternating current (AC) power source 201, a main switch 202 for supplying AC power obtained from the AC power source 201 to a motor 204, a power circuit 203 which converts the AC power supplied from the AC power source 201 into direct current (DC) power which the respective units of an operation panel 206, a display panel 207, a wireless communication unit 208, and a control unit 209 can use and outputs the DC power, and a switch 205 for controlling driving of the motor 204 according to a command signal from the operation panel 206.

In addition, the dust collector 1 includes the operation panel 206 that receives an operation with respect to the dust collector 1 from the user, the display panel 207 that displays an operation state of the dust collector 1 receiving the operation received via the operation panel 206, the wireless communication unit 208 that communicates wirelessly between the dust collector 1 and the battery pack 6, and the control unit 209 that controls the respective units of the dust collector 1.

The operation panel 206 includes a communication mode switch 206a that switches ON/OFF of the wireless communication performed by the wireless communication unit 208 and a strength switch 206b that switches the setting of the strength of the driving force of the motor 204 or between single acting/linked acting. Single acting refers to a mode in which the dust collector 1 operates alone without linking with the battery pack 6, and linked acting refers to a mode in which a linked operation where the dust collector 1 and the battery pack 6 are linked is performed.

The display panel 207 is a panel that displays information relating to the communication state (non-communication, attempting to connect, communication established), the driving state, the operation mode of the dust collector 1, such as the communication state, the strength of the motor rotation speed, and the single acting/linked acting which the control unit 209 sets by receiving presses on the respective switches of the operation panel 206. For example, the control unit 209 displays a green lamp indicating that the communication is established in a favorable communication state on the display panel 207 in the case where the communication speed is at or above a certain level, and displays a red lamp indicating that the communication state is not favorable on the display panel 207 in the case where the communication speed is below the level. In addition, for example, the control unit 209 displays "strong" indicating that the output of the motor is high on the display panel 207 in the case where the rotation speed of the motor 204 is equal to or higher than a predetermined threshold, and displays "weak" indicating that the output of the motor is low on the display panel 207 in the case where the rotation speed of the motor 204 is lower than the predetermined threshold. Moreover, for example, the control unit 209 displays the operation mode (single acting/linked acting) operated at the strength switch 206b.

The wireless communication unit 208 is a unit that transmits or receives predetermined information to/from the battery pack installed to the power tool according to a wireless communication standard, such as Wi-Fi (registered trademark) communication or Bluetooth (registered trademark) communication. The wireless communication unit 208 is, for example, configured as a circuit unit including a chip on which a communication module for performing wireless communication according to the above standard is mounted and an antenna for transmitting and receiving radio waves within a frequency band defined by the above standard.

The control unit 209 is a unit for controlling the respective units of the dust collector 1. The control unit 209 performs control over the motor 204 in correspondence with whether a linking signal is received from the battery pack installed to the power tool. In addition, in the case where the strength switch 206b is operated to be set to a linked mode, the control unit 209 performs processes such as attempting, connecting, disconnecting the wireless communication with the battery pack 6. The specific processes performed by the control unit 209 will be described in the following.

Figure 3:
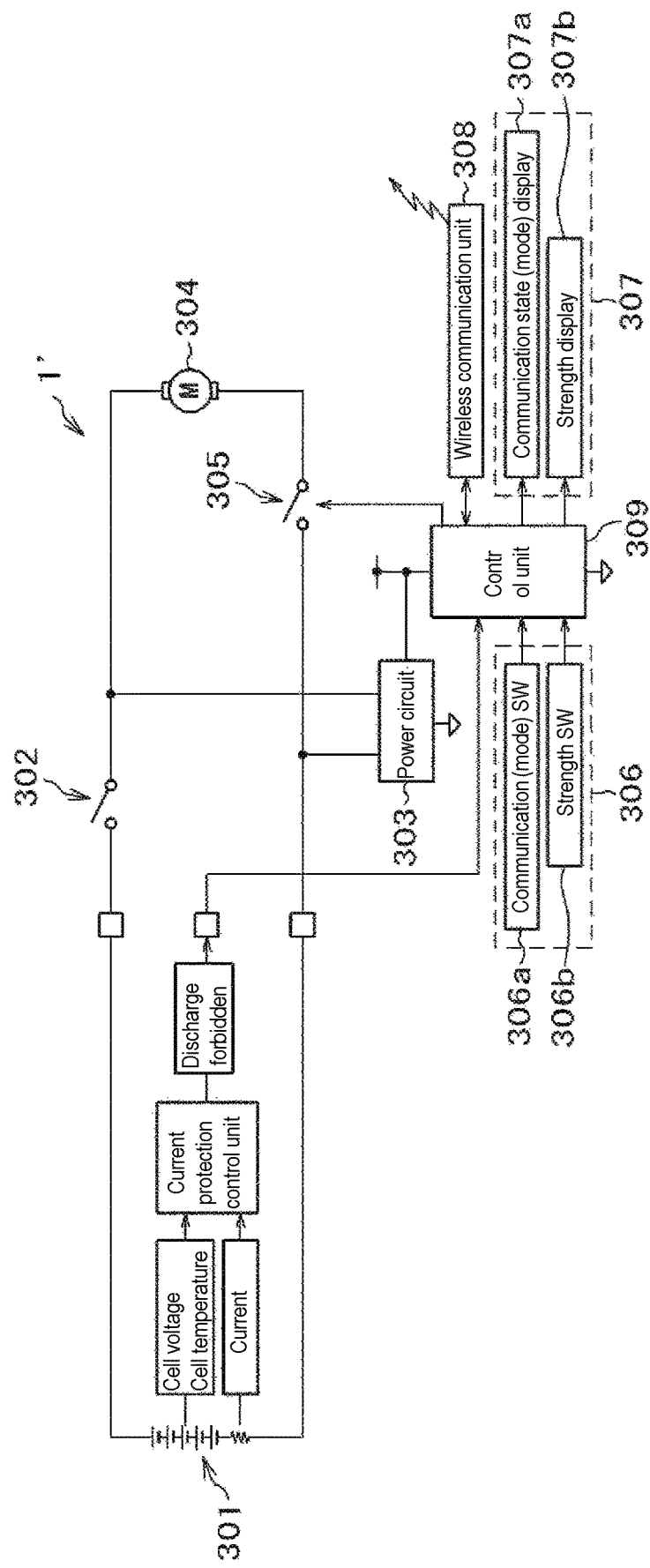
FIG. 3 is a schematic diagram of a circuit configuration of a dust collector (DC dust collector) as an example of the external device.

While FIG. 2 describes a dust connector supplied with power from an AC power source, as shown in FIG. 3, it can also be configured that a dust collector 1' receives power supply from a DC power source such as a battery included in the dust collector 1.

FIG. 3 is a schematic diagram of a circuit configuration of the dust collector (DC dust collector) as an example of the external device. As shown in FIG. 3, the DC dust collector includes a direct current (DC) power source 301 configured by a battery cell, etc., a main switch 302 for supplying the DC power obtained from the DC power source 301 to a motor 304, a power circuit 303 that outputs the DC power supplied from the DC power source 301 to the respective units of an operation panel 306, a display panel 307, a wireless communication unit 308, and a control unit 309, and a switch 305 for controlling the driving of the motor 304 according to a command signal from the operation panel 306. Since the configurations of the respective units of the operation panel 306, the display panel 307, the wireless communication unit 308, and the control unit 309 are the same as the AC dust collector shown in FIG. 2, the descriptions in this regard will be omitted here. In reality, various detection circuits that detect the voltages, temperatures, currents, etc., of the battery cells forming the DC power source 301, a protection circuit that protects over-charge, over-discharge, over-current with respect to the battery cells, and a control circuit that controls the discharge are disposed.

Figure 4:
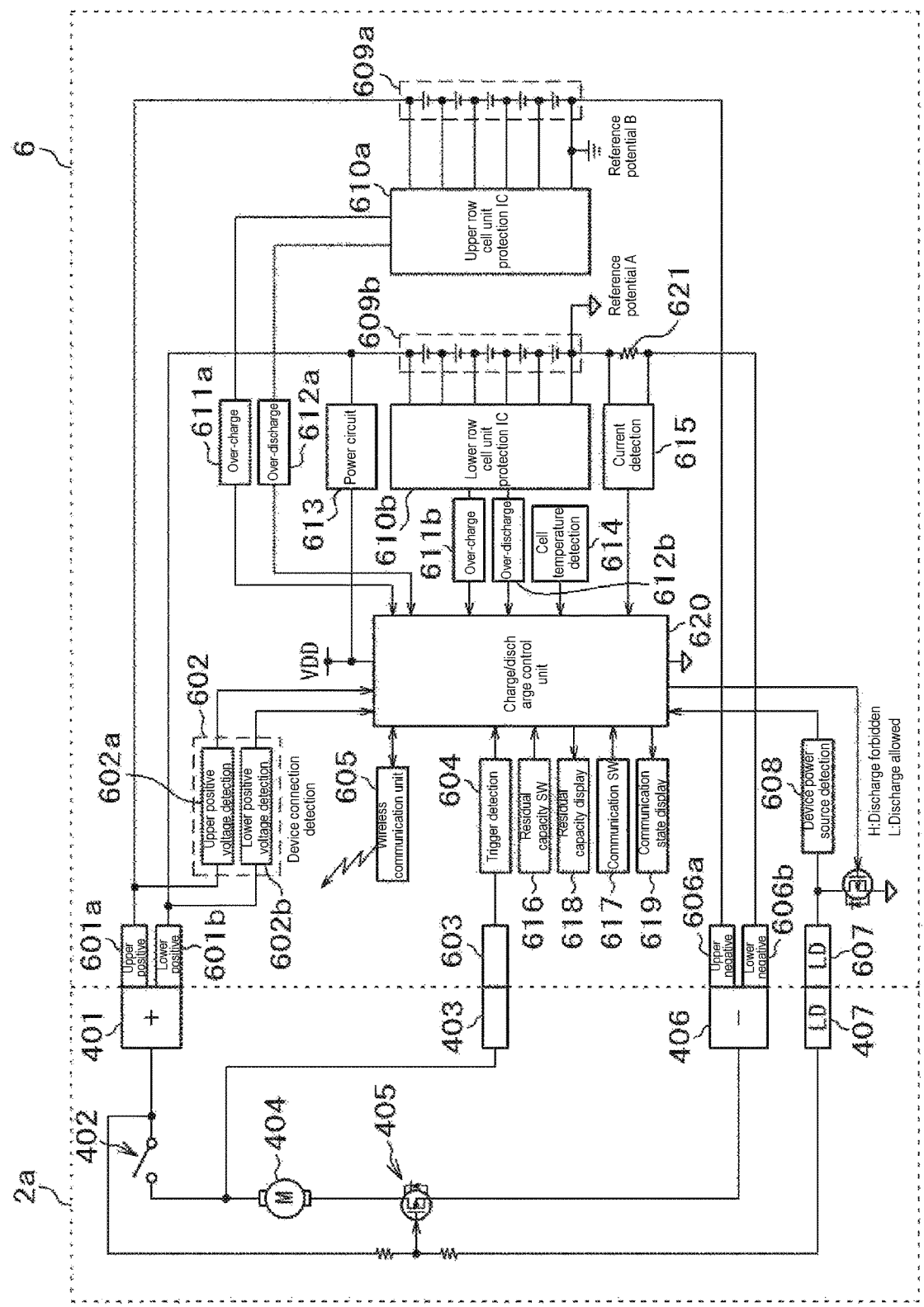
FIG. 4 is a schematic diagram of a connection circuit configuration of a circular saw without an MCU, as an example of a power tool, and a battery pack.

FIG. 4 is a schematic diagram of a connection circuit configuration of the battery pack 6 and a circular saw 2a (without a micro controller unit (MCU)) as an example of the power tool. As shown in FIG. 4, the circular saw 2a without the MCU has a tool side positive terminal 401, a main switch 402 for supplying power supplied from the battery pack 6 to a motor 404, a tool side trigger detection terminal 403 for detecting the power being supplied from the battery pack 6, the motor 404 for driving the circular saw 2a without MCU, a switching element 405 for switching between passing and blocking of a charge current from the tool side positive terminal 401 to a tool side negative terminal 406, the tool side negative terminal 406, and a tool side LD terminal 407 that outputs a voltage value of the power tool. The switching element 405 is, for example, a P-channel type field effect transistor (FET) or an insulated gate bipolar transistor (IGBT).

The battery pack 6 includes two cell units whose rated output voltage is 18V, and is a battery compatible with two types of voltages, i.e., 36V and 18V. As shown in FIG. 4, the battery pack 6 includes an upper positive terminal (terminal for supplying power to the power tool) 601a for connecting a first cell unit, which is one unit of the 18V cell units, and the tool side positive terminal 401, a lower positive terminal 601b for connecting a second cell unit, which is the other cell unit of the 18V cell units, and the tool side positive terminal 401, and a voltage detection circuit 602 for detecting the voltage applied to the positive terminals 601. The voltage detection circuit 602 includes an upper positive voltage detection circuit 602a for detecting the voltage applied to the upper positive terminal 601a and a lower positive voltage detection circuit 602b for detecting the voltage applied to the lower positive terminal 601b.

In addition, the battery pack 6 has a battery side trigger detection terminal 603 for connecting with the tool side trigger detection circuit 403, a trigger detection circuit 604 for detecting the reception of the power being supplied from the power tool by the battery side trigger detection terminal 603, a wireless communication unit 605, which is a circuit for communication with the external device (e.g., the dust collector 1) according to a wireless communication standard, such as Wi-Fi (registered trademark) communication or Bluetooth (registered trademark) communication, an upper negative terminal 606a for connecting the first cell unit and the tool side negative unit 406, and a lower negative terminal 606b for connecting the second cell unit and the tool side negative unit 406. In addition, the battery pack 6 has a battery side LD terminal 607 that inputs the voltage value of the power tool and a device power detection circuit 608 for detecting the voltage value of the power tool by the battery side LD terminal 607.

In addition, the battery pack 6 has a cell unit 609a, which is the first cell unit connected to the upper positive terminal 601a, and an upper row cell unit protection circuit 610a that protects the cell unit 609a. In the cell unit 609a, a plurality of battery cells are connected in series. An over-charge detection circuit 611a and an over-discharge detection circuit 612a are connected to the upper row cell unit protection circuit 610a.

In addition, the battery pack 6 has a cell unit 609b, which is the second cell unit connected to the lower positive terminal 601b, and a lower row cell unit protection circuit 610b that protects the cell unit 609b. In the cell unit 609b, a plurality of battery cells are connected in series. An over-charge detection circuit 611b and an over-discharge detection circuit 612b are connected to the lower row cell unit protection circuit 610b.

These protection circuits monitor the voltages of the respective battery cells and serve to prevent over-charge or over-discharge of any of the battery cells. Since the voltage of the battery cell increases when the battery cell is charged, when the charge continues, and the voltage of the battery cell reaches a threshold voltage (charge limit voltage) of full charge, a signal is output from the protection circuit. These protection circuits also output a signal in the case where the voltage of at least one of the battery cells drops to a threshold voltage (discharge limit voltage) that draws concerns of over-discharge. As an example, the protection circuit outputs a high signal in the case where the battery pack 6 is at a normal usage voltage that is neither overly discharged nor fully charged, and outputs a low signal, such as a setting voltage, in a state other than the normal state, such as the case of notifying of over-discharge or full charge.

A power circuit 613 is a circuit that generates operation voltages of the cell units based on the voltages of the first cell unit and the second cell unit and supplies the operation voltages to a charge/discharge control unit 620.

A cell temperature detection circuit 614 includes a temperature detection element, such as a thermistor that is not shown herein, disposed in a vicinity of each of the battery cells that form the cell unit 609a and the cell unit 609b, detects the temperature of each battery cell, and transmits the temperature to the charge/discharge control unit 620.

A current detection circuit 615 detects the current of the cell unit 609b based on the voltages on two ends of a resistor 621 (fixed resistance) in serial connection with the cell unit 609b, and transmits the current to the charge/discharge control unit 620.

A residual capacity switch 616 is a switch for the user to verify the residual capacity of the battery pack 6. A communication switch 617, as an example of an operated unit, is a switch allowing the user to verify the communication state of the battery pack 6 and controlling the communication (switching among non-communication, attempting to connect, communication established) between the battery pack 6 and the external device. It is not required to use one single communication switch 617 to perform the controls (switching among non-communication, attempting to connect, communication established) with the external device. It may also be that communication switches are disposed in correspondence with the respective controls.

A residual capacity display panel 618 is a panel for, in the case where the user presses the residual switch 616, displaying the residual capacity of the battery pack 6 by the charge/discharge control unit 620. For example, in the case where the residual capacity of the battery pack 6 is equal to or greater than a predetermined threshold, the charge/discharge control unit 620 displays a green lamp indicating that the residual capacity is sufficient on the residual capacity display panel 618. In the case where the residual capacity of the battery pack 6 is less than the predetermined threshold, the charge/discharge control unit 620 displays a red lamp indicating that the residual capacity is low on the residual capacity display panel 618.

A communication state display panel 619 is a panel for, in the case where the user presses the communication switch 617, displaying a pairing state with the external device that communicates wirelessly, or displaying the communication state (non-communication, attempting to connect, communication established) of the wireless communication unit 605 by the charge/discharge control unit 620. For example, the charge/discharge control unit 620 displays a green lamp indicating that the communication is established in a favorable communication state on the communication state display panel 619 in the case where the communication speed is at or above a certain level, and displays a red lamp indicating that the communication state is not favorable on the communication state display panel 619 in the case where the communication speed is below the level. In addition, for example, in the case where the pairing process is successfully carried out, the communication state display panel 619 displays a blue lamp for the successful pairing process, and, in the case where the paring process fails, the communication state display panel 619 displays a red lamp for the failed pairing process.

The charge/discharge control unit 620 is a circuit which includes a central processing unit (CPU) that outputs a driving signal based on a program and data, a read only memory (ROM) that stores the program and the data, a random access memory (RAM) that temporarily stores the data, and a timer, etc., and controls the operations of the respective units of the battery pack 6.

In FIG. 4, an example in which the circular saw 2a without the MCU, as an example of the power tool, is connected to the battery pack 6 is described. In the following, the connection circuit configurations of other examples of the power tool will be described.

Figure 5:
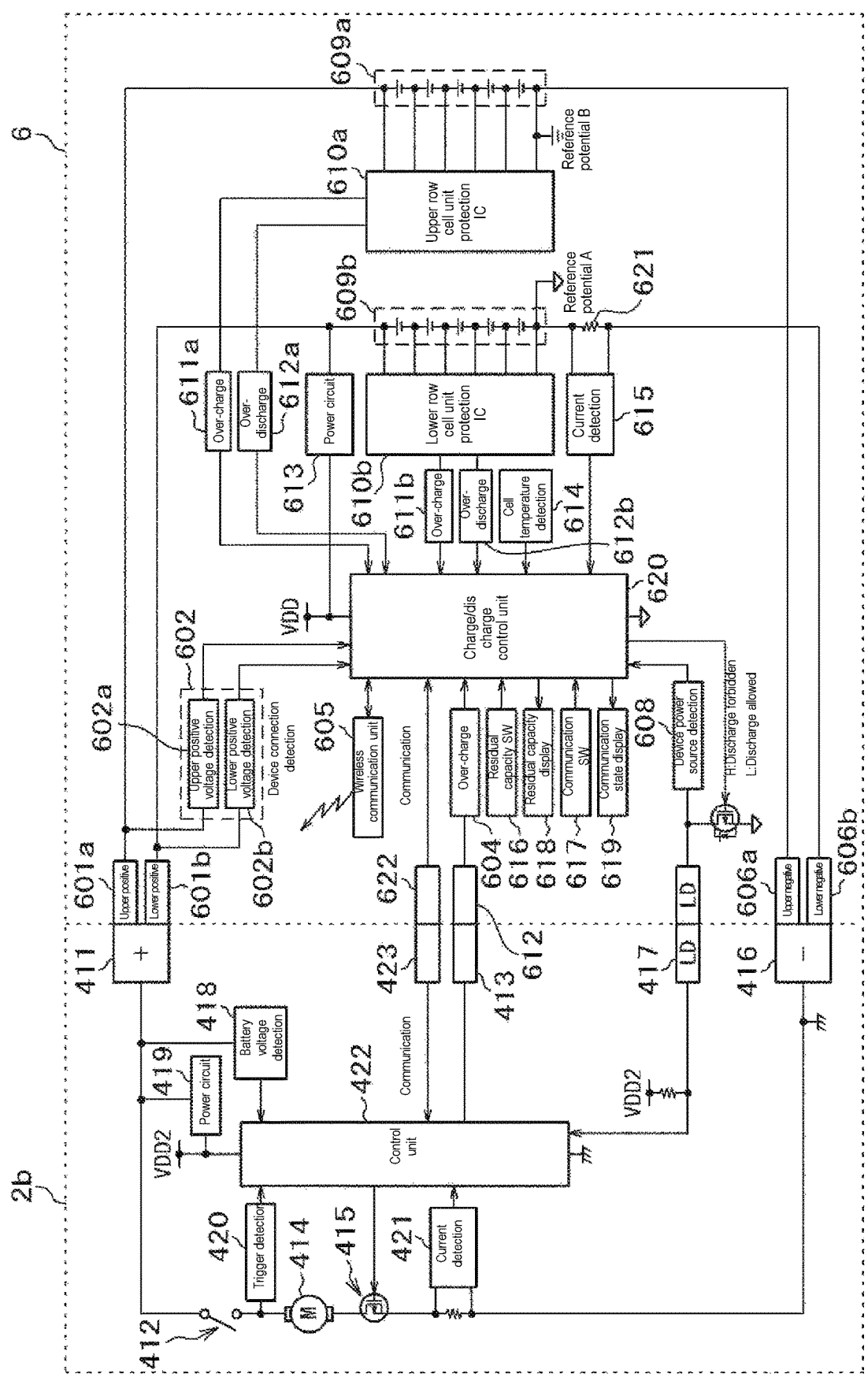
FIG. 5 is a schematic diagram of a connection circuit configuration of a circular saw with an MCU, as another example of the power tool, and the battery pack.

FIG. 5 is a schematic diagram of a connection circuit configuration of a circular saw 2b with an MCU, as another example of the power tool, and the battery pack 6. Except for a communication connection terminal 622, the configuration of the battery pack 6 shown in FIG. 5 is the same as the configuration shown in FIG. 4. Therefore, the same reference symbols will be used, and the same descriptions will be omitted. The communication connection terminal 622 is a connection terminal for the charge/discharge control unit 620 of the battery pack 6 to communicate with a control unit 422 of the circular saw 2b with the MCU to transmit and receive various control information.

As shown in FIG. 5, the circular saw 2b with the MCU has a tool side positive terminal 411, a main switch 412 for supplying power supplied from the battery pack 6 to a motor 414, a tool side trigger detection terminal 413 for detecting the power being supplied from the battery pack 6, the motor 414 for driving the circular saw 2b with the MCU, a switching element 415 for switching between passing and blocking of a charge current from the tool side positive terminal 411 to a tool side negative terminal 416, the tool side negative terminal 416, and a tool side LD terminal 417 that outputs a voltage value of the power tool. The switching element 415, like the case of FIG. 4, is configured by a P-channel type FET or an IGBT, for example.

In addition, the circular saw 2b with the MCU has a battery voltage detection circuit 418, a power circuit 419, a trigger detection circuit 420, a current detection circuit 421, a control unit 422, and a communication connection terminal 423.

The battery voltage detection circuit 418 is a detection member for measuring the voltage of the battery pack 6, and the output thereof is connected to an A/D converter of the control unit 422. A digital value corresponding to the detected battery voltage is input from the A/D converter, and the control unit 422 compares the digital value with a predetermined value set in advance, and sets, in the case where the battery residual capacity is less than the predetermined value, i.e., at the time of the over-discharge state, the FET to a blocked state. That is, by setting the gate signal of the FET to LOW, the control unit 422 temporarily stops the rotation of the motor 414 to protect the battery pack 6.

The power circuit 419 is a circuit for maintaining the power of the control unit 422. The control unit 422 is started in the case where the main switch 412 is turned off in the state where the power of the control unit 422 is not turned on. By continuously transmitting the command of keeping the power from the control unit 422 to the power circuit 419, even in the state where the main switch 412 is in the returned state, the power supply to the control unit 422 is maintained, and the control unit 422 continues operating.

The trigger detection circuit 420 is a circuit for detecting that the main switch 412 is turned off and outputting a signal indicating that the main switch 412 is turned off to the control unit 422.

The current detection circuit 421 is a circuit that detects a current flowing in the circuit (current flowing in the motor 414), and is connected to the A/D converter of the control unit 422. A potential difference between the tool side negative terminal 416 connected to the negative terminal of the battery pack 6 and the tool side positive terminal on the upstream side of a discharge path with respect to the tool side negative terminal 416 in the discharge path (the voltages on two ends of the shunt resistance) is detected by the current detection circuit 421, and a digital value corresponding to the current value detected by the current detection circuit 421 is input to the A/D converter of the control unit 422. The control unit 422 compares the converted digital value and a predetermined threshold set in advance, and makes a determination of trigger-ON (switch-ON) if the potential difference is equal to or greater than the threshold and makes a determination of trigger-off (switch-off) if the potential difference is less than or equal to the threshold or is zero.

The control unit 422 is composed of a microcomputer, and controls the respective units of the circular saw 2b having the MCU.

The communication connection terminal 423 is a connection terminal for the control unit 422 to communicate with the charge/discharge control unit 620 of the battery pack 6 to transmit and receive various control information.

Figure 6:
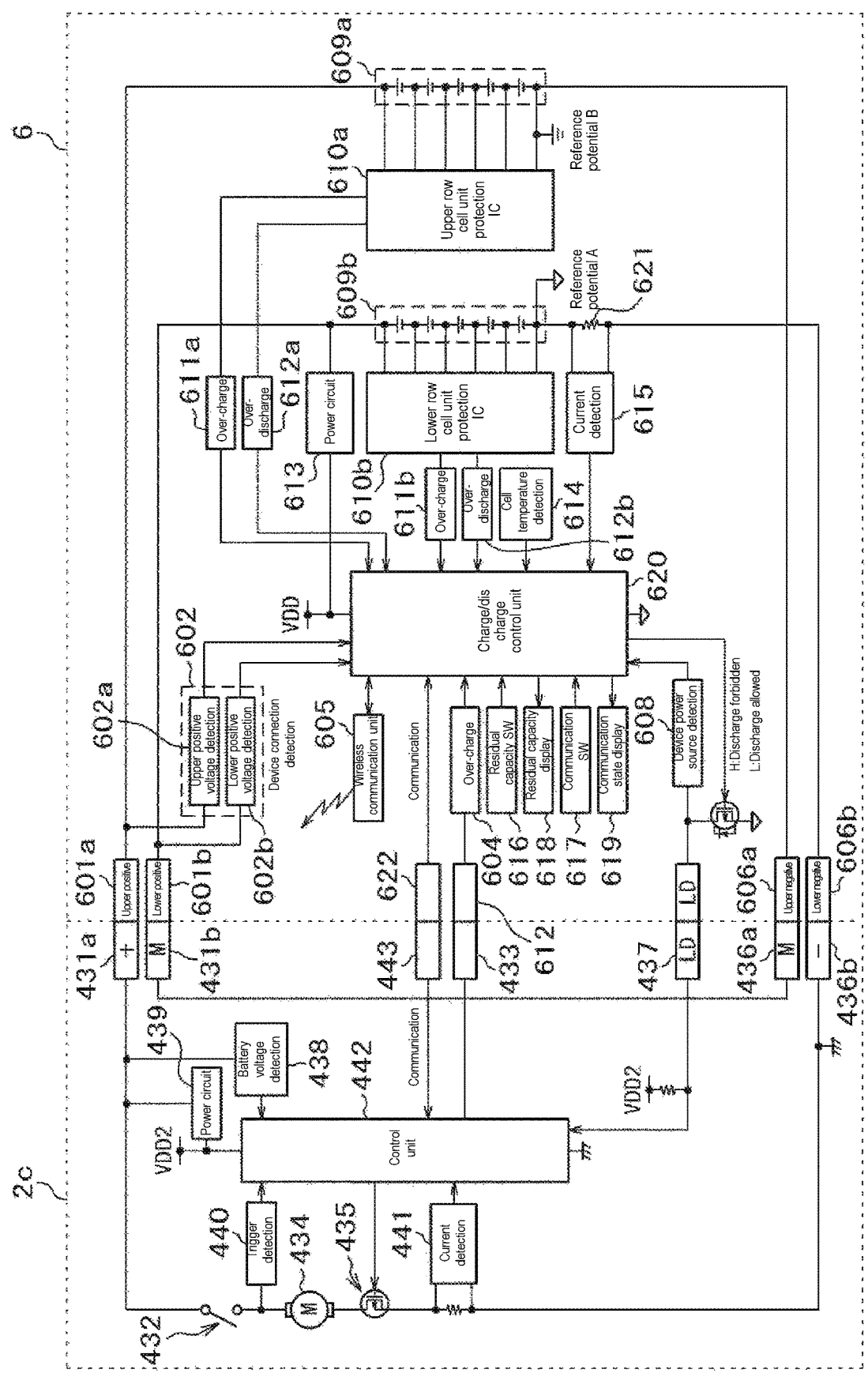
FIG. 6 is a schematic diagram of a connection circuit configuration of a MV circular saw, as yet another example of the power tool, and the battery pack.

FIG. 6 is a schematic diagram of a connection circuit configuration of a multi-volt (MV) circular saw 2c, as yet another example of the power tool, and the battery pack 6. The configuration of the battery pack 6 shown in FIG. 6 is the same as the configuration shown in FIG. 5. Therefore, the same reference symbols will be used, and the same descriptions will be omitted.

As shown in FIG. 6, the MV circular saw 2c has a tool side positive terminal 431a for connecting with an upper positive terminal 601a of the battery pack 6, a tool side multi-volt positive terminal 431b for connecting with a lower positive terminal 601b of the battery pack 6, a main switch 432 for supplying power supplied from the battery pack 6 to a motor 434, a tool side trigger detection terminal 433 for detecting the power being supplied from the battery pack 6, the motor 434 for driving the MV circular saw 2c, a switching element 435 for switching between passing and blocking of a charge current from the tool side positive terminal 431a to a tool side negative terminal 436b, a tool side multi-volt negative terminal 436a for connecting the tool side multi-volt positive terminal 431sb and the upper negative terminal 606a of the battery pack 6, the tool side negative terminal 436b for connecting with the lower negative terminal 606b of the battery pack 6, and a tool side LD terminal 437 that outputs the voltage value of the power tool.

The switching element 435, like the case of FIG. 5, is configured by a P-channel type FET or an IGBT, for example.

In addition, the MV circular saw 2c has a battery voltage detection circuit 438, a power circuit 439, a trigger detection circuit 440, a current detection circuit 441, a control unit 442, and a communication connection terminal 443. The respective units are the same as the battery voltage detection circuit 418, the power circuit 419, the trigger detection circuit 420, the current detection circuit 421, the control unit 422, and the communication connection terminal 423 shown in FIG. 5, therefore, the descriptions thereof will be omitted.

Accordingly, in the wireless linking system 100, various power tools are connected to the battery pack 6. As shown in the following, the battery pack 6 of the embodiment can detect the connection states of the upper positive terminal 601a and the lower positive terminal 601b, as the connection terminals without depending on the circuit configuration on the power tool side.

Figure 7:
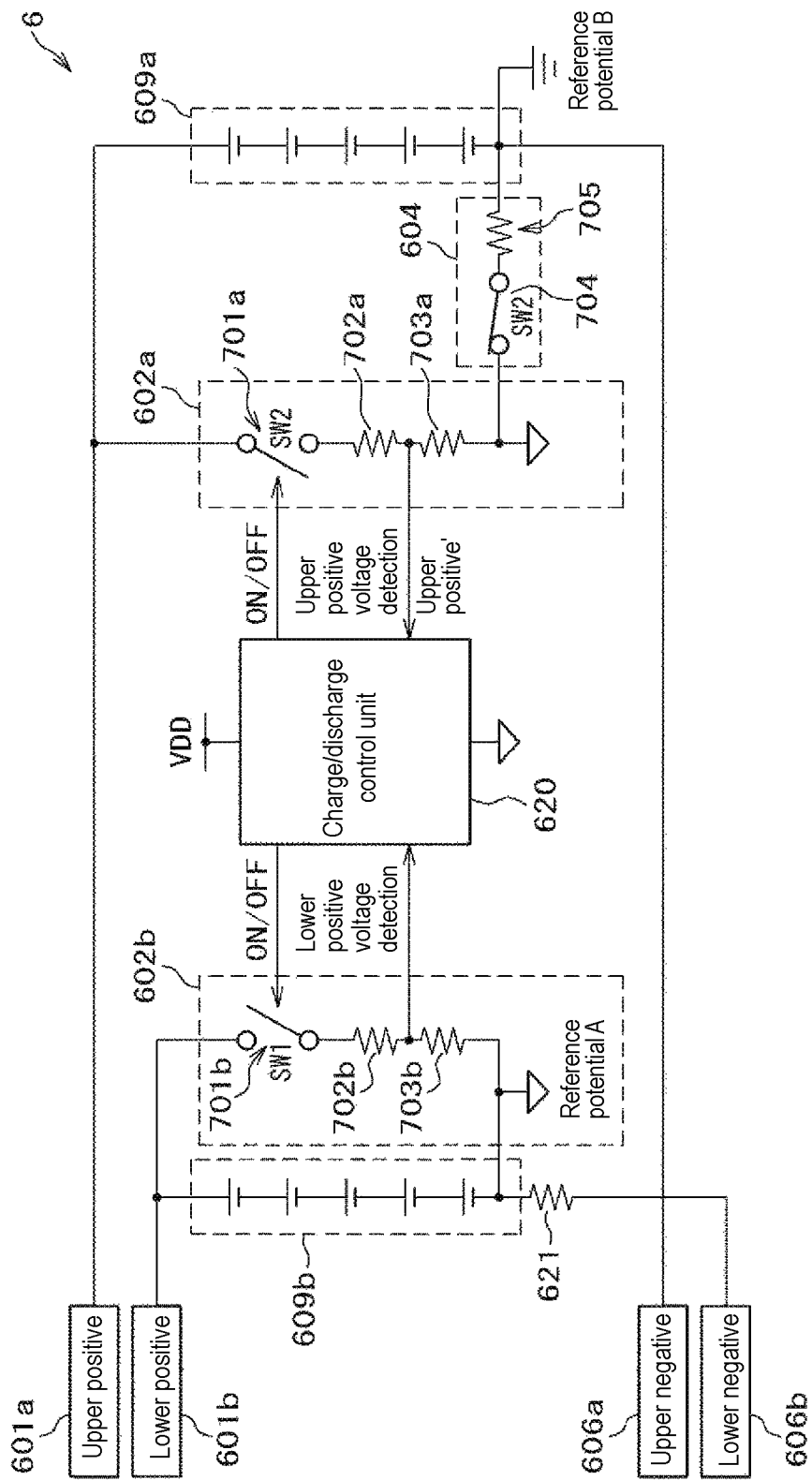
FIG. 7 is a diagram of a connection circuit configuration of main units of the battery pack in a state in which the power tool is not connected.

FIG. 7 is a diagram of a connection circuit configuration of main units of the battery pack 6 in a state in which the power tool is not connected.

The upper positive voltage detection circuit 602a includes a switch 701a that turns on/off the upper positive voltage detection circuit 602a according to the command from the charge/discharge control unit 620 and a resistor 702a and a resistor 703a for detecting a voltage (upper positive voltage) applied to the upper positive terminal 601a at the time when the switch 701a is ON.

The lower positive voltage detection circuit 602b includes a switch 701b that turns on/off the lower positive voltage detection circuit 602b according to the command from the charge/discharge control unit 620 and a resistor 702b and a resistor 703b for detecting a voltage (lower positive voltage) applied to the lower positive terminal 601b at the time when the switch 701b is ON.

The trigger detection circuit 604 includes a switch 704 that is turned on at the time when the power tool is not connected, and a resistor 705 that detects a voltage (upper positive' voltage) applied to the upper positive terminal 601a at the time when the switch 704 is ON.

In FIG. 7, the charge/discharge control unit 620 can calculate a detected value of the upper positive voltage by using the following formula. Detected value of upper positive voltage=(detected value of upper positive' voltage)×(resistor 702a+resistor 703a)/resistor 703a

In addition, the detected value of the upper positive' voltage can be calculated by using the following formula. In the following formula, the voltage of the upper cell unit is the voltage of the cell unit 609a. Detected value of upper positive' voltage=(voltage of upper cell unit)×resistor 703a/(resistor 702a+resistor 703a+resistor 705)

From these formulae, the detected value of the upper positive voltage can be eventually calculated by using the following formula. Detected value of upper positive voltage=(voltage of upper cell unit)×(resistor 702a+resistor 703a)/(resistor 702a+resistor703a+resistor 705)

Figure 8:
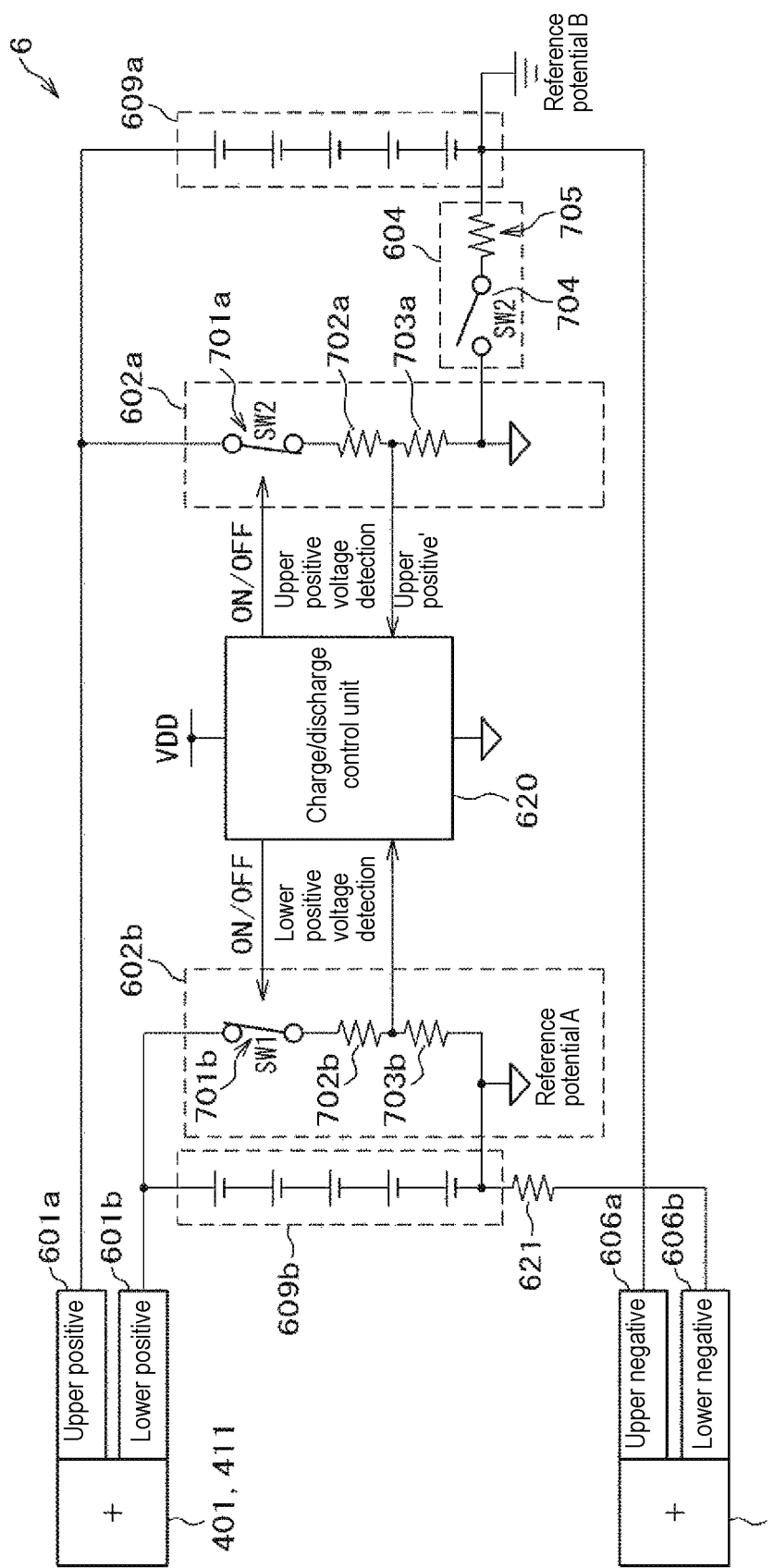
FIG. 8 is a diagram of a connection circuit configuration of the main units of the battery pack in a state in which a power tool corresponding to 18V is connected.

FIG. 8 is a diagram of a connection circuit configuration of the main units of the battery pack 6 in a state in which a power tool corresponding to 18V is connected. The configuration of the battery pack 6 shown in FIG. 8 is the same as the case of FIG. 7. Therefore, the same reference symbols will be used, and the same descriptions will be omitted. In FIG. 8, the tool side positive terminal 401 (or the tool side positive terminal 411) is respectively connected to the upper positive terminal 601a and the lower positive terminal 601b of the battery pack 6, and the tool side negative terminal 406 (or the tool side negative terminal 416) is respectively connected to the upper negative terminal 606a and the lower negative terminal 606b of the battery pack 6.

In FIG. 8, the charge/discharge control unit 620 can calculate a detected value of the upper positive voltage by using the following formula. That is, the detected value of the upper positive' voltage is calculated according to the following: Detected value of upper positive' voltage=(voltage of upper cell unit)×resistor 703a/(resistor 702a+resistor 703a+resistor 705). Here, when the resistor 705 is sufficiently smaller than the resistor 703a (resistor 705<<resistor 703a), the above formula can be represented as follows: Detected value of upper positive' voltage≈(voltage of upper cell unit)×resistor 703a/(resistor 702a+resistor 703a)

In FIG. 8, since the upper cell unit and the lower cell unit are connected in parallel, a formula can be expressed in the following: Detected value of upper positive' voltage≈(voltage of lower cell unit)×resistor 703a/(resistor 702a+resistor 703a). Therefore, eventually, the detected value of the upper positive voltage can be calculated by using the following formula: Detected value of upper positive voltage=(voltage of upper cell unit)=(voltage of lower cell unit)

Figure 9:
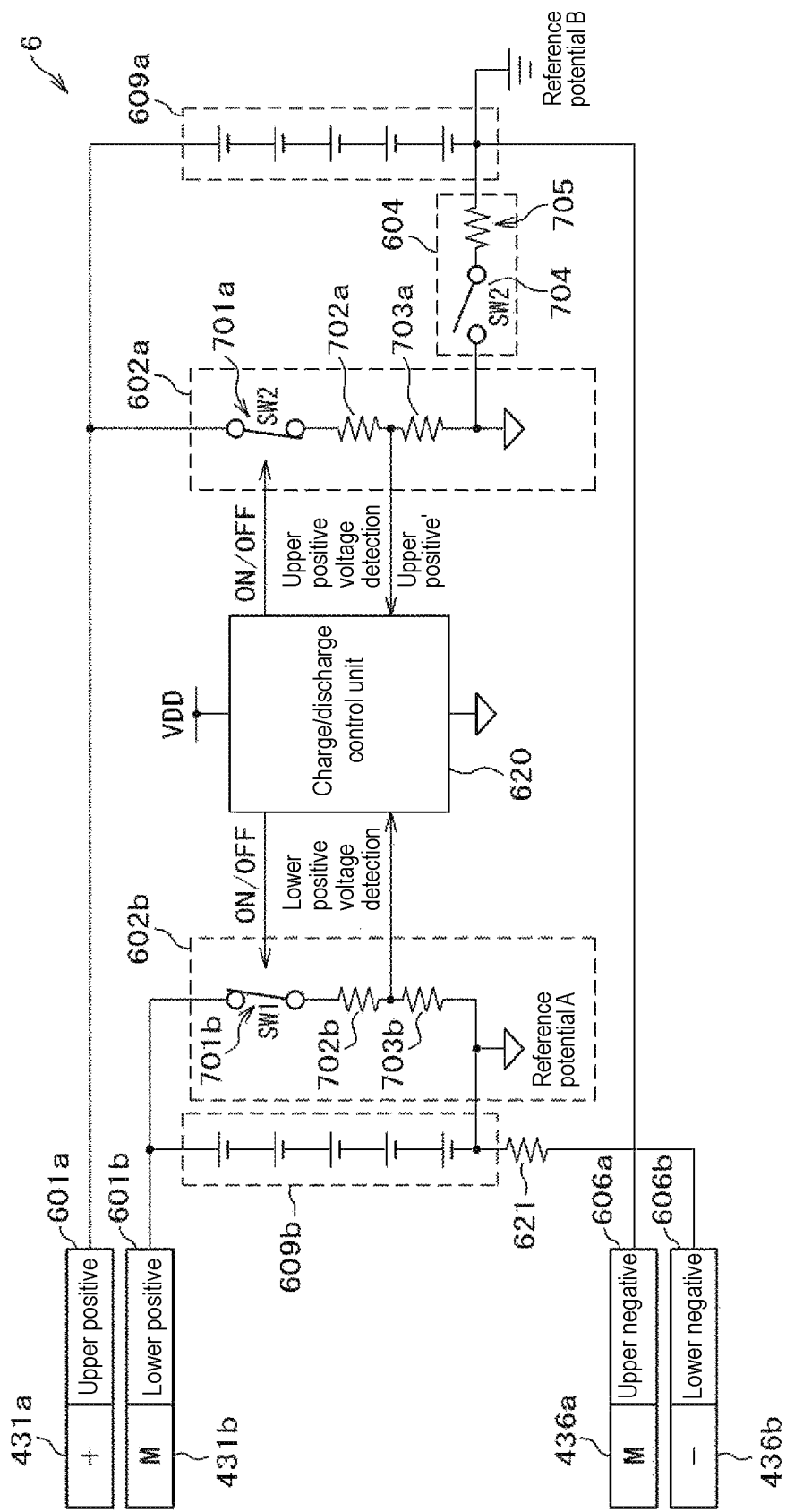
FIG. 9 is a diagram of a connection circuit configuration of the main units of the battery pack in a state in which a power tool corresponding to 36V is connected.

FIG. 9 is a diagram of a connection circuit configuration of the main units of the battery pack 6 in a state in which a power tool corresponding to 36V is connected. The configuration of the battery pack 6 shown in FIG. 8 is the same as the case of FIG. 7. Therefore, the same reference symbols will be used, and the same descriptions will be omitted. In FIG. 9, the tool side positive terminal 431a is connected to the upper positive terminal 601a of the battery pack 6, and the tool side multi-volt positive terminal 431b is connected to the lower positive terminal 601b of the battery pack 6. In addition, the tool side multi-volt negative terminal 436a is connected to the upper negative terminal 606a of the battery pack 6, and the tool side negative terminal 436b is connected to the lower negative terminal 606b of the battery pack 6. Accordingly, the cell unit 609a and the cell unit 609b are connected in series via the tool side multi-volt positive terminal 431b and the tool side multi-volt negative terminal 436a.

In FIG. 9, the charge/discharge control unit 620 can calculate a detected value of the upper positive voltage by using the following formula. That is, the detected value of the upper positive' voltage is calculated according to the following: Detected value of upper positive' voltage=(voltage of upper cell unit+voltage of lower cell unit)×resistor 703a/(resistor 702a+resistor 703a). Therefore, eventually, the detected value of the upper positive voltage can be calculated by using the following formula: Detected value of upper positive voltage=(voltage of upper cell unit)+(voltage of lower cell unit)

Accordingly, in the embodiment, the charge/discharge control unit 620 of the battery pack 6 determines the type of the power tool connected to the battery pack 6 and whether a power tool is connected or not connected by calculating the voltage (upper positive voltage) applied to the upper positive terminal 601a, without depending on the circuit configuration of the power tool side. That is, the charge/discharge control unit 620 detects three states, that is, a state in which a power tool is connected, a state in which a power tool not compatible with multi-volt is connected, and a state in which a power tool compatible with multi-volt is connected in correspondence with the value of the voltage (upper positive voltage) applied to the upper positive terminal 601a. Specifically, from the respective formulae shown in FIGS. 7 to 9, in the case where the detected value of the upper positive voltage is greater than or equal to the detected value of the lower positive voltage (FIGS. 8 and 9), the charge/discharge control unit 620 determines that a power tool is connected, and in the case where the detected value of the upper positive voltage is less than the lower positive voltage (FIG. 7), the charge/discharge control unit 620 determines the connection of the power tool as canceled.

Regarding the switch 704 and the resistor 705, the setting as follows is preferred. Specifically, in the state in which a power tool is not connected, the upper positive voltage is not indefinite with respect to a reference potential A. In addition, when the switch 704 is turned on, a discharge path of the lower cell unit can be created during serial connection. Therefore, from the perspective of saving power or preventing the voltage imbalance between the voltages of the upper and lower cell units, it is preferred that the switch 704 is turned on only at the timing of detection, and in the case where the power tool in serial connection is detected, the frequency at which the switch 704 is turned on may be as low as possible.

Figure 10:
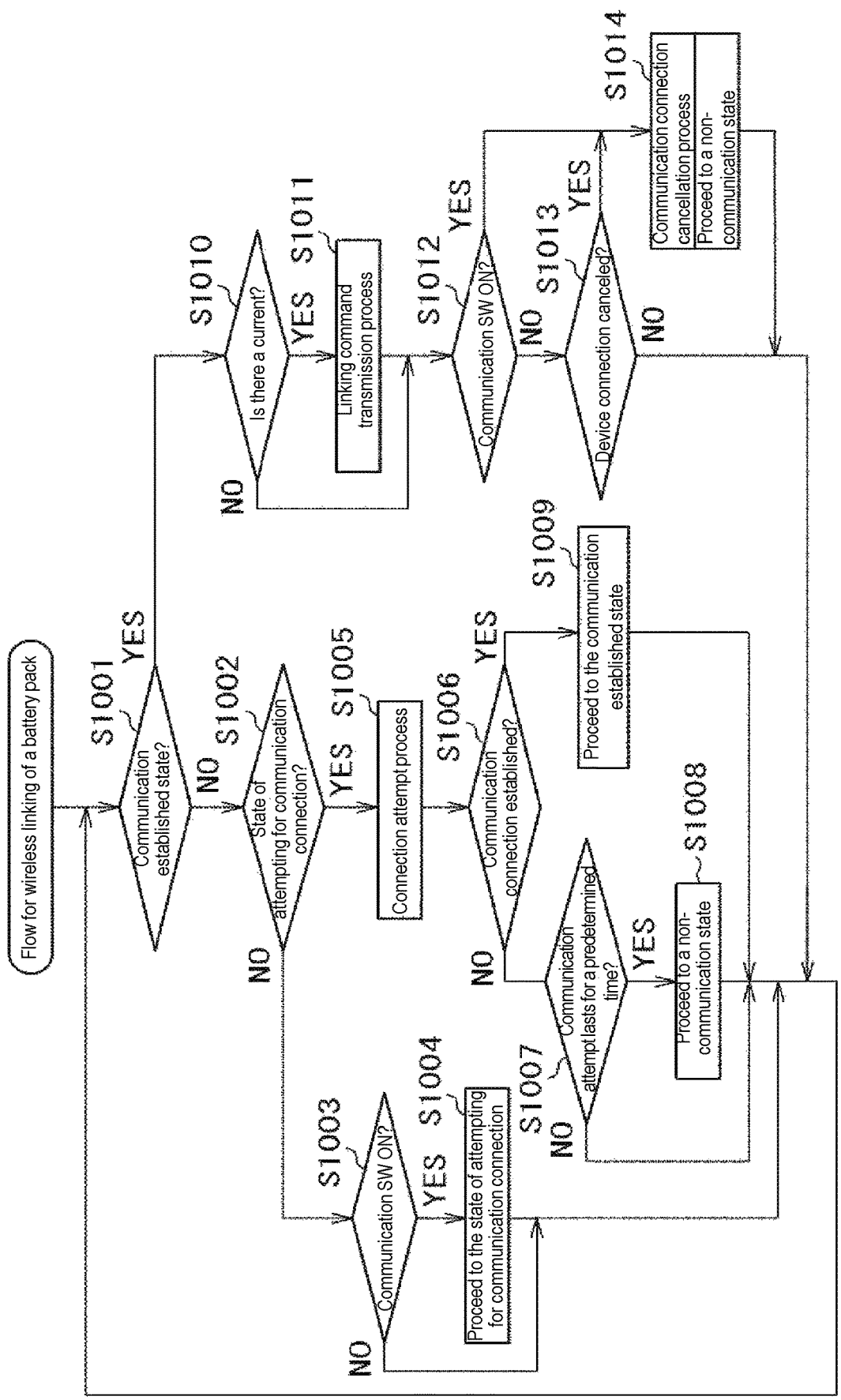
FIG. 10 is a flowchart illustrating processes of the battery pack in a wireless linking system.

FIG. 10 is a flowchart illustrating the processes of the battery pack 6 in the wireless linking system 1000. The wireless communication unit 605 of the battery pack 6 attempts to communicate with the external device (e.g., the dust collector 1) according to the command from the charge/discharge control unit 620, and determines whether it is in a communication established state (S1001).

In the case where the wireless communication unit 605 determines that it is not in the communication established state with the external device (S1001: No), the wireless communication unit 605 determines whether the current communication state is a state of attempting for communication connection (S1002). For example, the wireless communication unit 605 determines that the current communication state is the state of attempting for communication connection in the case of within a predetermined time since the attempt for communication starts, or the wireless communication unit 605 determines that the current communication state is the state of attempting for communication connection in the case where the communication switch 617 is pressed, as a predetermined operation with respect to the battery pack 6.

In the case where the wireless communication unit 605 determines that the current communication state is not the state of attempting for communication connection (S1002: No), the wireless communication unit 605 determines whether the communication switch 617 is pressed, as the predetermined operation with respect to the battery pack 6, and whether a command signal for attempting for communication connection is received from the charge/discharge control unit 620 (S1003). In the case where the wireless communication unit 605 determines that the command signal for attempting for communication connection is received from the charge/discharge control unit 620 (S1003: Yes), the wireless communication unit 605 proceeds to the state of attempting for communication connection. Alternatively, in the case where the wireless communication unit 605 determines that the command signal for attempting for communication connection is not received from the charge/discharge control unit 620 (S1003: No), the flow returns to S1001 without any action, and subsequent processes are repeated.

In S1002, in the case where the wireless communication unit 605 determines that the current communication state is the state of attempting for communication connection, the wireless communication unit 605 performs a connection attempt process (S1005). The connection attempt process is, for example, a process that performs a paring process with the external device that communicates wirelessly. It may also be that the wireless communication unit 605 proceeds to perform the connection attempt process in the case where the communication switch 617 is pressed, as the predetermined operation with respect to the battery pack 6.

The wireless communication unit 605 determines whether a communication connection is established through the connection attempt process (S1006), and further determines whether a communication attempt is performed within a predetermined time (S1007) in the case where the communication connection is not established through the connection attempt process (S1006: No).

In the case where the wireless communication unit 605 determines that the communication attempt is performed within the predetermined time (S1007: Yes), the wireless communication unit 605 determines that the communication connection with the external device cannot be established and proceeds to a non-communication state (S1008). It may also be that the wireless communication unit 605 proceeds to the non-communication state in the case where the communication switch 617 is pressed, as the predetermined operation with respect to the battery pack 6. Alternatively, in the case where the wireless communication unit 605 determines that the communication attempt is not performed within the predetermined time (S1007: No), the flow returns to S1001 without any action, and subsequent processes are repeated.

In S1006, in the case where the wireless communication unit 605 determines that the communication connection is established through the connection attempt process (S1006: Yes), the wireless communication unit 605 proceeds to the communication established state (S1009). It may also be that the wireless communication unit 605 proceeds to the communication established state in the case where the communication switch 617 is pressed, as the predetermined operation with respect to the battery pack 6.

In S1001, in the case where the wireless communication unit 605 determines that it is in the communication established state with the external device (S1001: Yes), the charge/discharge control unit 620 determines whether the voltage detection circuit 602 detects the voltage applied to the positive terminal 601 (or the current detection circuit 615 detects the current of the cell unit 609b) (S1010). That is, the charge/discharge control unit 620 determines whether the voltage detected by the voltage detection circuit 602 satisfies the predetermined relation as shown in FIG. 8 or FIG. 9.

In the case where the charge/discharge control unit 620 determines that the voltage detection circuit 602 detects the voltage applied to the positive terminal 601 (or the current detection circuit 615 detects the current of the cell unit 609b) (S1010: Yes), the charge/discharge control unit transmits a linking signal (linking command) to the external device with which the communication connection is established in S1006 (S1011). Alternatively, in the case where the charge/discharge control unit 620 determines that the voltage detection circuit 602 detects the voltage applied to the positive terminal 601, and the current detection circuit 615 does not detect the current of the cell unit 609b (S1010: No), the flow proceeds to S1012 without any action.

The charge/discharge control unit 620 determines whether the communication switch 617 of the battery pack 6 is pressed in S1012 and, in the case where the switch is pressed (S1012: Yes), the flow proceeds to S1014. Alternatively, in the case where the charge/discharge control unit 620 determines that the switch is not pressed (S1012: No), the charge/discharge control unit 620 determines whether the connection of the power tool is canceled (S1013). Whether the connection of the power tool is canceled may be determined by the charge/discharge control unit 620 according to whether the voltage detected by the voltage detection circuit 602 no longer satisfies the predetermined relation as shown in FIG. 8 or FIG. 9, or whether the signal for detecting the reception of the power being supplied from the power tool is no longer received from the trigger detection circuit 604. By performing such process, the cancellation of the connection of the power tool can be determined on the side of the battery pack 6.

In the case where the charge/discharge control unit 620 determines that the communication switch 617 of the battery pack 6 is pressed (S1012: Yes), or in the case where the charge/discharge control unit 620 determines that the connection of the power tool is canceled (S1013: Yes), the charge/discharge control unit 620 transmits a wireless communication cancellation command for canceling the wireless communication with the external device in the communication established state to perform a communication connection cancellation process, and proceeds to a non-connection state (S1014). It may also be that the communication connection cancellation process is performed in the case where the communication switch 617 is pressed, as the predetermined operation with respect to the battery pack 6. Alternatively, in the case where the charge/discharge control unit 620 determines that the connection of the power tool is not canceled (S1013: No), the flow returns to S1001, and the subsequent processes are repeated.

Accordingly, the charge/discharge control unit 620 of the battery pack 6 performs a first determination process (e.g., S1001, S1003 of FIG. 10) that determines whether the wireless communication with the external device is established, and, in the case where the charge/discharge control unit 620 determines that the wireless communication with the external device is established, the charge/discharge control unit 620 performs a second determination process (e.g., S1010 of FIG. 10) that determines whether the voltage detection circuit 602 detects the voltage applied to the positive terminal 601 and whether the current detection circuit 615 detects the current of the cell unit 609*b*. In addition, in the case whether the first determination process and the second determination process are both satisfied, a linking signal (linking command) for a linked operation with the external device is transmitted to the external device. Therefore, the linking command can be transmitted reliably with respect to the external device capable of wireless communication. In addition, since the battery pack performs all the above processes, the compatibility with the external device can be maintained even if the external device is a power tool without a wireless communication function. In addition, as in S1013 and S1013 of FIG. 10, when the connection with the power tool is canceled, since the wireless communication with the external device is canceled, malfunctions of the external device due to a linked operation resulting from the battery pack side can be avoided.

Figure 11:
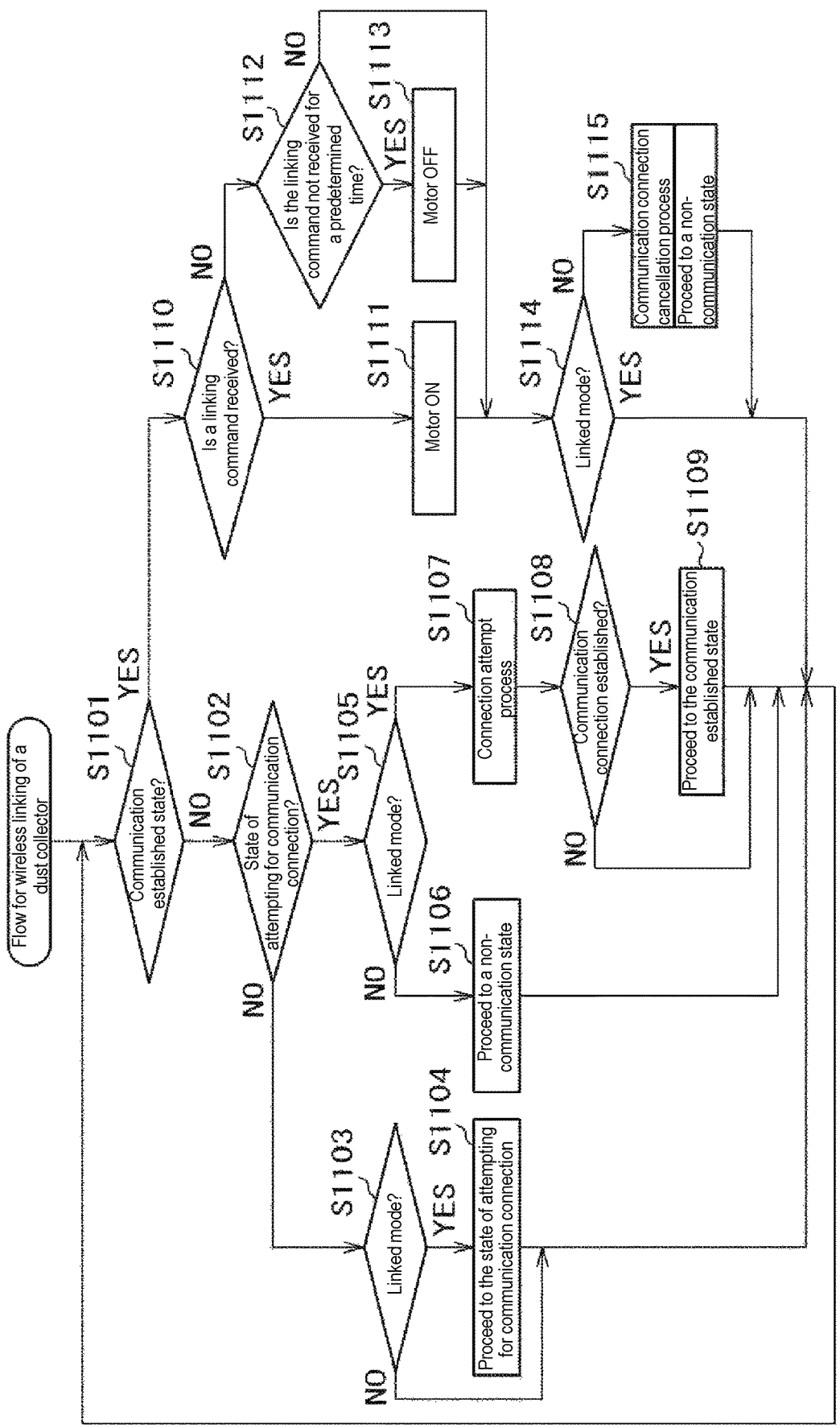
FIG. 11 is a flowchart illustrating processes of the external device in the wireless linking system.

FIG. 11 is a flowchart illustrating processes of the external device (e.g., the dust collector 1) in the wireless linking system 1000. In the following, while the case where the external device is the AC dust collector shown in FIG. 2 is described, the DC dust collector shown in FIG. 3 and other power tools can also be considered in a similar manner.

The wireless communication unit 208 of the dust collector 1 attempts to communicate with the battery pack 6 according to the command from the control unit 209, and determines whether it is in the communication established state with the battery pack 6 (S1101).

In the case where the wireless communication unit 208 determines that it is not in the communication established state with the battery pack 6 (S1101: No), the wireless communication unit 208 determines whether the current communication state is a state of attempting for communication connection (S1102). For example, the wireless communication unit 208 determines that the current communication state is the state of attempting for communication connection in the case of within a predetermined time since the attempt for communication starts.

In the case where the wireless communication unit 208 determines that the current communication state is not the state of attempting for communication connection (S1102: No), the control unit 209 determines whether the strength switch 206*b* of the operation panel 206 is operated to be set to the linked mode (S1103). In the case where the wireless communication unit 208 determines that the strength switch 206*b* of the operation panel 206 is operated to be set to the linked mode (S1103: Yes), the control unit 209 proceeds to the state of attempting for communication connection. Alternatively, in the case where the wireless communication unit 209 determines that the strength switch 206*b* of the operation panel 206 is not operated to be set to the linked mode (S1103: No), the flow returns to S1101 without any action, and subsequent processes are repeated.

In S1102, in the case where the wireless communication unit 208 determines that the current communication state is the state of attempting for communication connection (S1102: Yes), the control unit 209 determines whether the linked mode is set (S1105), like the case of S1103.

In the case where the control unit 209 determines that the linked mode is set (S1105: Yes), the wireless communication unit 208 performs the connection attempt process (S1107). The connection attempt process is, for example, a process that performs a paring process with the battery pack 6 that communicates wirelessly. Alternatively, in the case where the linked mode is not set (S1105: No), the wireless communication unit 208 returns to S1101 and repeats the subsequent processes after proceeding to the non-communication state.

The wireless communication unit 208 determines whether the communication connection is established through the connection attempt process (S1108), and returns to S1101 without any action and repeats the subsequent processes in the case where the wireless communication unit 208 determines whether the communication connection is not established through the connection attempt process (S1108: No).

In S1108, in the case where the wireless communication unit 208 determines that the communication connection is established through the connection attempt process (S1108: Yes), the wireless communication unit 208 proceeds to the communication established state (S1109).

In S1101, in the case where the wireless communication unit 208 determines that it is in the communication established state with the battery pack 6 (S1101: Yes), the wireless communication unit 208 determines whether the linking signal (linking command) is received from the battery pack 6 (S1110). In the case where the wireless communication unit 208 determines that the linking signal (linking command) is received from the battery pack 6 (S1110: Yes), the control unit 209 turns on the motor 204. Alternatively, in the case where the wireless communication unit 208 determines that the linking signal (linking command) is not received from the battery pack 6 (S1110: No), the control unit 209 determines whether the state in which the wireless communication unit 208 does not receive the linking signal (linking command) lasts a predetermined time (S1112).

In the case where the control unit 209 determines that the state in which the wireless communication unit 208 does not receive the linking signal (linking command) lasts the predetermined time (S1112: Yes), the motor 204 is turned off (S1113). Alternatively, in the case where the control unit 209 determines that the state in which the wireless communication unit 208 does not receive the linking signal (linking command) does not last the predetermined time (S1112: No), the flow proceed to S1114 without any action.

The control unit 209 determines whether the linked mode is set in S1103 or S1105 (S1114), and, in the case where the control unit 209 determines that the linked mode is set (S1114: Yes), the flow returns to S1101 without any action, and the subsequent processes are repeated.

Alternatively, in the case where the control unit 209 determines that the linked mode is not set (S1114: No), the control unit 209 performs the communication connection cancellation process for canceling the wireless communication with the external device in the communication established state and proceeds to the non-connection state (S1115).

Accordingly, the control unit 209 of the external device performs a third determination process (e.g., S1101 of FIG. 11) that determines whether the wireless communication with the battery pack is established, and, in the case where the control unit 209 determines that the wireless communication is established, further determines whether the linking signal (linking command) is received from the battery pack 6. In the case where the linking signal (linking command) is received, the control unit 209 turns on the motor 204. Therefore, a linked operation can be reliably carried out with the battery pack 6. In addition, the control unit 209 determines whether the linked mode is set in the state where the motor 204 is ON, and in the case where the linked mode is not set in the state, the control unit 209 cancels the wireless communication with the battery pack 6. Therefore, malfunctions of the external device due to the linked operation resulting from an operation on the external device side can be prevented.

Also, while the embodiment is configured to, as the communication connection cancellation process, transmit the wireless communication cancellation command to the external device, the means for the communication connection cancellation process is not limited to the above. For example, it may also be a configuration where connection confirmation signals are transmitted and received between the battery pack and the external device in the wireless communication state and the wireless communication is canceled in the case where one of the battery pack and the external device does not receive the connection confirmation signal for a predetermined time, and that the communication connection cancellation process is set as a process of stopping transmitting the connection confirmation signal for the predetermined time or more. In addition, while the embodiment is configured as performing the communication connection cancellation process and proceeding to the non-connection state when the connection between the battery pack and the power tool is determined as canceled (S1013: Yes, S1014 of FIG. 10), it may also be configured that the communication connection cancellation process is performed after a predetermined time after the connection between the battery pack and the power tool is determined as canceled. That is, instead of performing the communication connection cancellation process immediately after the connection between the battery pack and the power tool is canceled, the communication connection cancellation process may also be performed after the predetermined time.

With such configuration, in the case where the connection of the power tool to the battery pack and the cancellation of the connection are to be consecutively performed repetitively for several times in a short time, it is not necessary to perform the processes of FIG. 10 from the very beginning, and the operability can be facilitated. Therefore, such configuration is effective. For example, there is a case where the battery pack and the power tool have a contact failure between terminals due to chattering resulting from vibrations of the power tool, etc. Or, there is a case where the connected battery pack is temporarily removed and connected again to confirm whether the connected battery is the one to be used (confirming marks etc., on the connection surface with the power tool, etc.). In addition, even in the case where the connection between the battery pack and the power tool is not canceled (S1013: No in FIG. 10), when one of the battery pack, the power tool and the dust collector is in a non-use state for a second predetermined time (e.g., several hours), the communication connection cancellation process may also be performed. With such configuration, the consumed power of the battery pack can be suppressed.

What is claimed is:

1. A battery pack that supplies a driving power source to a power tool, the battery pack comprising:
   a wireless communication unit, communicating wirelessly with an external device;
   a control unit;
   a first cell unit and a second unit in which a plurality of battery cells are connected in series;
   a first positive terminal and a first negative terminal connected with the first cell unit; and
   a second positive terminal and a second negative terminal connected with the second cell unit,
   wherein the battery pack is configured as being connectible with, as the power tool, one of a first power tool driven a first voltage and a second power tool driven a second voltage higher than the first voltage,
   wherein when the battery pack is connected to the first power tool, the first positive terminal and the second positive terminal, and the first negative terminal and the second negative terminal are configured to be respectively short-circuited by a tool-side positive terminal and a tool-side negative terminal of the first power tool, so that the first cell unit and the second cell unit are connected in parallel, or
   wherein when the battery pack is connected to the second power tool, the first positive terminal and the second negative terminal are configured to be respectively connected with a tool-side positive terminal and a tool-side negative terminal of the second power tool, and the second positive terminal and the first negative terminal are connected, so that the first cell unit and the second cell unit are connected in series.

2. The battery pack as claimed in claim 1, wherein,
   the control unit, performing a first determination process to determine a wireless communication connection state with the external device, and
   in a case where the control unit determines in the first determination process that wireless communication is established, the control unit transmits a linking command to the external device, and during a state in which the wireless communication is established, the control unit is able to perform a communication connection cancellation process to cancel the wireless communication.

3. The battery pack as claimed in claim 2, further comprising a terminal connected to the power tool, wherein during the state in which the wireless communication is established, in a case where a connection between the power tool and the terminal is canceled, the control unit executes the communication connection cancellation process.

4. The battery pack as claimed in claim 3, wherein the terminal is a terminal that supplies power from the battery pack to the power tool.

5. The battery pack as claimed in claim 3, wherein the control unit executes the communication connection cancellation process after a predetermined time from cancellation of the connection between the power tool and the terminal.

6. The battery pack as claimed in claim 3, further comprising a voltage detection circuit that detects a voltage of the terminal,
wherein the control unit determines whether the connection between the power tool and the terminal is canceled based on a change of the voltage of the terminal.

7. The battery pack as claimed in claim 6, wherein the control unit is able to execute a second determination process that determines whether the voltage of the terminal is in a predetermined relation, and determines whether the connection between the power tool and the terminal is canceled through the second determination process.

8. The battery pack as claimed in claim 3, comprising a trigger detection circuit that detects a connection of the power tool to the battery pack,
wherein the control unit determines whether the connection of the power tool is canceled by determining whether a signal for detecting reception of power being supplied from the power tool is no longer received from the trigger detection circuit.

9. The battery pack as claimed in claim 2, comprising an operated unit that receives an operation for controlling the wireless communication with respect to the battery back,
wherein during the state in which the wireless communication is established, the control unit executes the communication connection cancellation process based on an operation performed with respect to the operated unit.

10. The battery pack as claimed in claim 2, wherein the control unit, as the communication connection cancellation process, transmits a wireless communication cancellation command that cancels the wireless communication to the external device.

11. The battery pack as claimed in claim 2, comprising:
a communication connection terminal, connected with the control unit and provided for transmitting and receiving control information,
wherein the battery pack is able to transmit the linking command to the external device regardless of whether a tool-side communication connection terminal of the power tool connectible with the communication connection terminal is provided.

12. The battery pack as claimed in claim 2, further comprising:
a communication connection terminal, connected with the control unit, and provided to transmit and receive information,
wherein the battery pack is configured as being connectible with, as the power tool, one of a first power tool having a tool-side communication connection terminal connectible with the communication connection terminal and a second power tool without the tool-side communication connection terminal, and
the control unit is configured to be able to detect information of a connected power tool regardless of whether the battery pack is connected to either the first power tool or the second power tool, and when the information is detected, the control unit is configured to be able to transmit a linking command to the external device.

13. The battery pack as claimed in claim 2, further comprising:
a detection unit, connected with the control unit, and provided for detecting driving of the power tool; and
a communication connection terminal, connected with the control unit, and provided to transmit and receive information,
wherein in a case where the communication connection terminal is connected with a tool-side communication connection terminal of the power tool, the control unit is configured to transmit and receive the information with the power tool via the communication connection terminal and the tool-side communication connection terminal, and
in a case where a wireless communication between the wireless communication unit and the external device is established, the control unit is configured to input driving information of the power tool via the detection unit, instead of via the communication connection terminal, and transmit a linking command to the external device via the wireless communication unit.

14. A wireless linking system, having the battery pack as claimed in claim 1, a power tool, and an external device having a wireless communication function,
wherein the power tool comprises:
a power tool motor;
a tip tool, driven by a driving force of the power tool; and
a tool side connection terminal for connecting with the battery pack, the tool side connection terminal including the tool-side positive terminal and the tool-side negative terminal,
the external device comprises:
an external device motor;
a device wireless communication unit for communicating wirelessly with the battery pack; and
a device control unit, operating the external device motor based on a linking command received from the battery pack, and stopping an operation of the external device motor based on the communication connection cancellation process executed by the control unit.

15. The wireless linking system as claimed in claim 14, wherein the external device is a dust collector,
the dust collector is able to switch between a linked mode in which a linked operation where the dust collector and the battery pack are linked is performed and a single mode in which the dust collector operates alone without linking with the battery pack, and
in a case where the dust collector is set to the linked mode, the device control unit is configured to operate the external device motor when receiving the linking command from the battery pack, and in a case where the dust collector is set to the single mode, the device control unit is configured so as to not operate the external device motor due to the linking command.

16. The battery pack as claimed in claim 1,
wherein the control unit is configured to establish the wireless communication connection between the wireless communication unit and the external device regardless of whether the battery pack is connected to either the first power tool or the second power tool.

17. The battery pack as claimed in claim 16, further comprising a communication switch operated by a user, wherein the control unit is configured to allow the wireless communication connection between the wireless communication unit and the external device when the communication switch is operated.

18. The battery pack as claimed in claim 1, comprising:
a power circuit, supplying operation voltage to the control unit,
wherein in a state that the first cell unit and the second cell unit are connected in series, the first cell unit is positioned at high voltage side than the second cell unit, and the power circuit is connected to the second cell unit.

19. A system, having the battery pack as claimed in claim 1, and the power tool connected with the battery pack and supplied the driving power source from the battery pack.

20. The system as claimed in claim 19, the power tool is at least one of the first power tool and the second power tool.

21. A battery pack that supplies a driving power source to a power tool, the battery pack comprising:

a wireless communication unit, communicating wirelessly with an external device;
a control unit;
a first cell unit and a second unit in which a plurality of battery cells are connected in series;
a first positive terminal and a first negative terminal connected with the first cell unit;
a second positive terminal and a second negative terminal connected with the second cell unit;
a first cell unit protection circuit, for protecting the first cell unit; and
a second cell unit protection circuit, for protecting the second cell unit,
wherein the control unit receives signals input from the first cell unit protection circuit and the second cell unit protection circuit.

\* \* \* \* \*